(12) United States Patent
Gilley

(10) Patent No.: US 10,000,109 B2
(45) Date of Patent: Jun. 19, 2018

(54) VEHICLE AIR CONDITIONING SYSTEM

(71) Applicant: DENSO International America, Inc., Southfield, MI (US)

(72) Inventor: Adam Gilley, Detroit, MI (US)

(73) Assignee: DENSO International America, Inc., Southfield, MI (US)

( * ) Notice: Subject to any disclaimer, the term of this patent is extended or adjusted under 35 U.S.C. 154(b) by 42 days.

(21) Appl. No.: 15/191,580

(22) Filed: Jun. 24, 2016

(65) Prior Publication Data

US 2017/0368912 A1 Dec. 28, 2017

(51) Int. Cl.
*F25B 1/00* (2006.01)
*B60H 1/32* (2006.01)
*B60H 1/00* (2006.01)

(52) U.S. Cl.
CPC ......... *B60H 1/323* (2013.01); *B60H 1/00357* (2013.01); *B60H 1/00885* (2013.01); *B60H 1/3208* (2013.01); *B60H 2001/3248* (2013.01); *B60H 2001/3289* (2013.01); *B60Y 2300/18016* (2013.01); *B60Y 2300/192* (2013.01); *B60Y 2300/45* (2013.01); *B60Y 2306/05* (2013.01)

(58) Field of Classification Search
CPC ........ F25B 41/062; F25B 49/022; B60P 3/20; B60H 1/00371; B60H 2001/00235
USPC .................. 62/115, 244, 498, 239
See application file for complete search history.

(56) References Cited

U.S. PATENT DOCUMENTS

| | | |
|---|---|---|
| 5,768,908 A | 6/1998 | Tanaka et al. |
| 7,260,947 B1 | 8/2007 | Harrison |
| 7,458,225 B2 | 12/2008 | Park et al. |
| 2002/0023448 A1* | 2/2002 | Ito ........................ B60H 1/3227 62/222 |
| 2002/0084769 A1 | 7/2002 | Iritani et al. |
| 2003/0070849 A1 | 4/2003 | Whittaker |
| 2003/0159455 A1* | 8/2003 | Aikawa .................. B60H 1/005 62/225 |
| 2005/0188717 A1* | 9/2005 | Aikawa .................. F25B 41/00 62/434 |
| 2009/0314023 A1 | 12/2009 | Labaste Mauhe et al. |
| 2011/0023509 A1 | 2/2011 | Gardiner |
| 2013/0333373 A1 | 12/2013 | Fong et al. |
| 2014/0230761 A1 | 8/2014 | Pilavdzic |
| 2014/0286803 A1 | 9/2014 | Orum et al. |

FOREIGN PATENT DOCUMENTS

| | | |
|---|---|---|
| CA | 2820535 A1 | 12/2013 |
| WO | WO-2012102787 A1 | 8/2012 |
| WO | WO-2014106054 A1 | 7/2014 |

* cited by examiner

*Primary Examiner* — Melvin Jones
(74) *Attorney, Agent, or Firm* — Harness, Dickey & Pierce, P.L.C.

(57) ABSTRACT

Air conditioning systems and methods for a vehicle having a start-stop engine system. The systems and methods cool the vehicle's passenger cabin when the vehicle's engine and air conditioning compressor are off.

15 Claims, 2 Drawing Sheets

| Operational State | Engine/AC Compressor | Valve V1 | Valve V2 | Valve V3 | Description |
|---|---|---|---|---|---|
| 1 | On | Closed | Output to Compressor | Input from Evaporator | At initial compressor engagement, CRT is pressurized to target pressure |
| 2 | On | Open | Output to Compressor | Input from Evaporator | After target pressure in CRT is met, valve V1 opens to allow refrigerant to pass through to condenser for standard AC operation |
| 3 | Off | Open | Output to Refrigerant Suction Tank | Closed | During short vehicle stops, compressed refrigerant is supplied from CRT and collected in RST |
| 4 | On | Closed | Closed | Input from RST | After engine restart, valve V3 is oriented to pull refrigerant from RST to reduce tank pressure to allow refrigerant collection during next vehicle stop. Valve V1 is closed to re-pressurize CRT. |
| 5 | On | Open | Output to Compressor | Input from Evaporator | After pressure of RST falls to or below a predetermined pressure, Valve V3 is oriented to direct refrigerant from the evaporator to the compressor |

FIG - 3

VEHICLE AIR CONDITIONING SYSTEM

FIELD

The present disclosure relates to a vehicle air conditioning system, such as for vehicles with a start-stop engine system.

BACKGROUND

This section provides background information related to the present disclosure, which is not necessarily prior art.

Vehicle start-stop engine systems advantageously stop the vehicle engine when the vehicle is not moving, such as when stopped at a stoplight, in order to increase fuel economy and reduce engine wear. While current start-stop engine systems are suitable for their intended use, they are subject to improvement. For example, vehicle air conditioning systems include a compressor, which is typically driven by the engine. When the engine is stopped by the start-stop engine system, the compressor is no longer driven, which presents issues with cooling the vehicle passenger cabin. The present teachings advantageously include air conditioning systems and methods for cooling a vehicle passenger cabin even when the engine and compressor have been turned off, such as by a vehicle start-stop engine system.

SUMMARY

This section provides a general summary of the disclosure, and is not a comprehensive disclosure of its full scope or all of its features.

The present teachings provide for air conditioning systems and methods for vehicles having a start-stop engine system. The systems and methods according to the present teachings advantageously cool the vehicle's passenger cabin even when the vehicle's engine and air conditioning compressor have been turned off.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a chart of various operational states of the air conditioning system of FIG. 2.

Corresponding reference numerals indicate corresponding parts throughout the several views of the drawings.

DETAILED DESCRIPTION

Example embodiments will now be described more fully with reference to the accompanying drawings.

Figure 1:
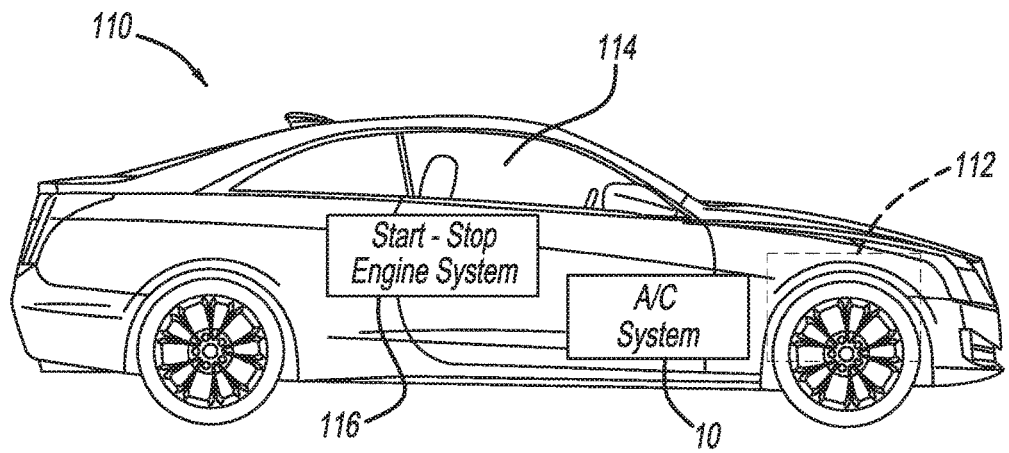
FIG. 1 illustrates an exemplary vehicle including an air conditioning system according to the present teachings.
Figure 2:
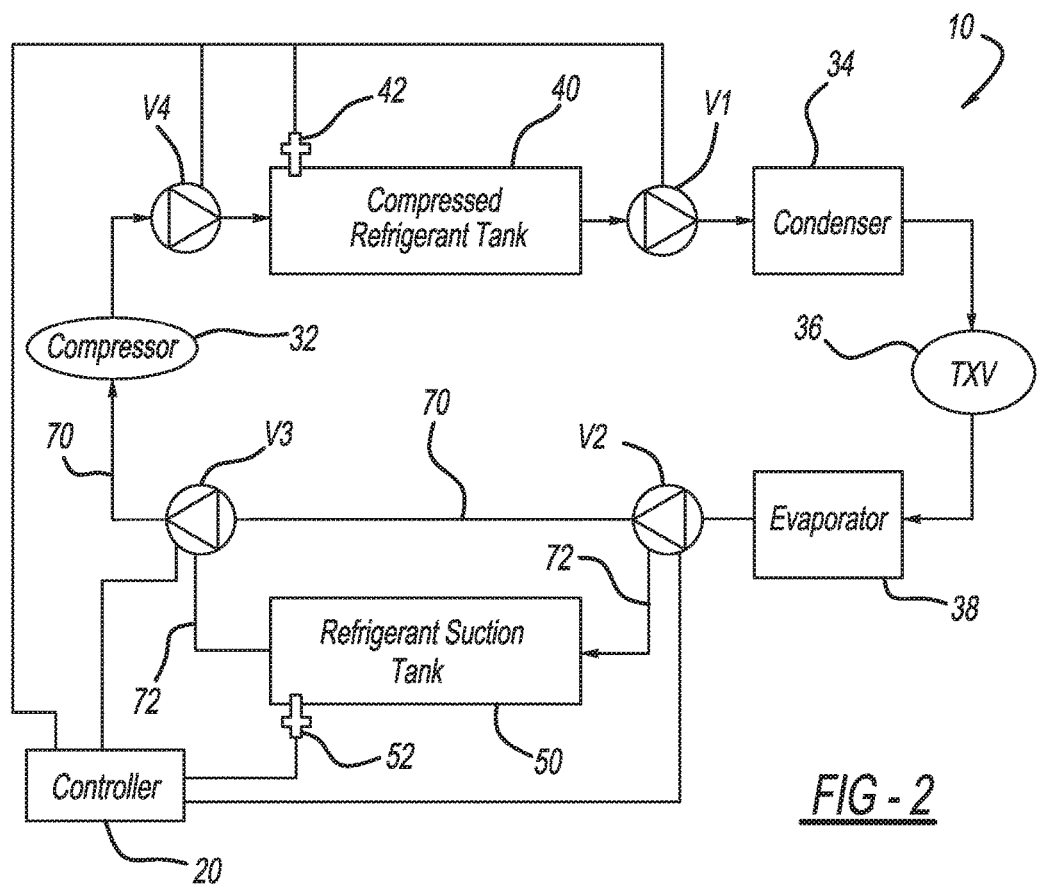
FIG. 2 is a diagram of an air conditioning system according to the present teachings.

FIGS. 1 and 2 illustrate a vehicle air conditioning system according to the present teachings at reference numeral 10. FIG. 1 illustrates the system 10 installed within a passenger vehicle 110. The vehicle 110 is illustrated for exemplary purposes only, as the system 10 can be included in any suitable vehicle, such as any suitable passenger vehicle, mass transit vehicle, military vehicle, construction vehicle, agricultural machine, etc. The exemplary vehicle 110 includes an engine 112 and a passenger cabin 114, which the vehicle air conditioning system 10 is configured to cool.

The vehicle 110 also includes a start-stop engine system 116, which is configured to stop the engine 112 when the vehicle 110 has been brought to a stop, such as at a stop light. When the vehicle 110 is a construction vehicle or agricultural machine, the system 116 can be configured to stop the engine 112 when the vehicle 110 is being loaded or unloaded. When the vehicle 110 is a mass transit vehicle, the system 116 can be configured to stop the engine 112 when the vehicle 110 is stopped to pick up or drop off passengers. The start-stop engine system 116 can be any suitable start-stop engine system known in the art. The start-stop engine system 116 provides numerous advantages, such as improved fuel economy and reduced engine wear.

The vehicle air conditioning system 10 is generally controlled by a controller 20. The controller 20 can be a control module, and may be replaced with the term "circuit." The term "controller" may refer to, be part of, or include processor hardware (shared, dedicated, or group) that executes code and memory hardware (shared, dedicated, or group) that stores code executed by the processor hardware. The code is configured to provide the features of the vehicle air conditioning system 10 described herein.

With reference to FIG. 2, the vehicle air conditioning system 10 generally includes a compressor 32, a condenser 34, a thermal expansion valve (TXV) 36, and an evaporator 38. The compressor 32, the condenser 34, the thermal expansion valve 36, and the evaporator 38 are conventional air conditioning system components, as one skilled in the art will recognize. The compressor 32 is a pump driven by a belt attached to a crankshaft of the engine 112. A refrigerant flow path 70 connects, and directs refrigerant to and from, each one of the compressor 32, condenser 34, thermal expansion valve 36, and evaporator 38.

The system 10 further includes a compressed refrigerant tank 40 along the refrigerant flow path 70 between the compressor 32 and the condenser 34. The compressed refrigerant tank 40 can be any suitable storage device for storing refrigerant that has been compressed by the compressor 32. The compressed refrigerant tank 40 includes a pressure sensor 42, which is any suitable sensor for determining pressure of refrigerant within the compressed refrigerant tank 40. The pressure sensor 42 is connected to the controller 20 for transmitting inputs to the controller 20 regarding pressure of refrigerant within the tank 40. Based on inputs from the pressure sensor 42, the controller is configured to determine and monitor pressure of refrigerant within the tank 40.

The vehicle air conditioning system 10 further includes a refrigerant suction tank 50 arranged between the evaporator 38 and the compressor 32 along a secondary refrigerant flow path 72. The refrigerant suction tank 50 is configured to receive refrigerant flowing from the evaporator 38, and store the received refrigerant therein, such as when the compressor 32 has been stopped by the start-stop engine system 116. The refrigerant suction tank 50 includes a pressure sensor 52, which can be any pressure sensor suitable for monitoring pressure of refrigerant therein. The pressure sensor 52 is connected to the controller 20, and the controller 20 is configured to process inputs from the pressure sensor 52 in order to determine and monitor the pressure of refrigerant within the refrigerant suction tank 50.

The vehicle air conditioning system 10 further includes a first valve V1 arranged along the refrigerant flow path 70 between the compressed refrigerant tank 40 and the condenser 34. A second valve V2 is arranged downstream of the evaporator 38 (with respect to flow of refrigerant through the system 10), and at a junction where the secondary refrigerant flow path 72 branches off of the refrigerant flow path 70. The valve V2 thus has a single refrigerant input from the evaporator 28 and two possible outputs. A first output along the refrigerant flow path 70, and a second output to the secondary refrigerant flow path 72 and the refrigerant suction tank 50. The valve V2 is any suitable valve that can be controlled by the controller 20 to direct refrigerant flow along either the refrigerant flow path 70 or the secondary refrigerant flow path 72. Refrigerant directed along the secondary refrigerant flow path 72 flows to the refrigerant suction tank 50.

The vehicle air conditioning system 10 further includes a third valve V3, which is arranged downstream of the second valve V2 where the secondary refrigerant flow path 72 returns to the refrigerant flow path 70. The third valve V3 can be any suitable valve configured to be controlled by the controller 20 to regulate flow of refrigerant to the compressor 32 from either the refrigerant suction tank 50 or directly from the evaporator 38. Refrigerant flowing directly to the compressor 32 from the evaporator 38 bypasses the refrigerant suction tank 50.

Between the compressor 32 and the compressed refrigerant tank 40 is a fourth valve V4. The fourth valve V4 is any suitable one way-valve configured to prevent refrigerant within the compressed refrigerant tank 40 from flowing back to the compressor 32, particularly when the compressor 32 is inactive.

With continued reference to FIGS. 1 and 2, and additional reference to FIG. 3, operation of the vehicle air conditioning system 10 will now be described. FIG. 3 illustrates various operational states of the vehicle air conditioning system 10, which will now be described in conjunction with an exemplary method 210 according to the present teachings. The method 210 is for cooling the passenger cabin 114 of the vehicle 110 when the engine 112 and the compressor 32 are stopped, such as when the start-stop engine system 116 stops the engine 112.

At operational state 1 of FIG. 3, the engine 112 and compressor 32 are active such that the compressor 32 pumps refrigerant through the one way valve V4 to the compressed refrigerant tank 40. The valve V1 is closed by the controller 20 in order to pressurize the compressed refrigerant tank 40 to a target pressure. The valve V2 is configured by the controller 20 such that refrigerant entering the valve V2 is output directly to the compressor 32 along the refrigerant flow path 70 and bypasses the refrigerant suction tank 50. Valve V3 is configured by the controller 20 to receive refrigerant flowing along the refrigerant flow path 70 that has bypassed the refrigerant suction tank 50, and to output the refrigerant to the compressor 32.

After the pressure of refrigerant within the compressed refrigerant tank 40 has reached the target pressure, as sensed by the pressure sensor 42 and determined by the controller 20 for example, the method 210 proceeds to operational state 2, in which the first valve V1 is opened, such as by the controller 20. The configuration of the valves V2 and V3 is not changed from operational state 1. Opening the valve V1 allows refrigerant to flow out of the compressed refrigerant tank 40 to the condenser 34, where the refrigerant is converted from a high pressure gas to a high pressure liquid. When valve V1 is open, input to the compressed refrigerant tank 40 from the compressor 32 is balanced with refrigerant output in order to maintain the target mass of high pressure gas in the compressed refrigerant tank 40. From the condenser 34, the refrigerant flows to the thermal expansion valve 36, where the pressure of the refrigerant is reduced. The low pressure refrigerant flows from the thermal expansion valve 36 to the evaporator 38, where the refrigerant absorbs heat in order to cool the passenger cabin 114. The refrigerant exits the evaporator 38 as a low pressure gas and is then directed back to the compressor 32 by the second valve V2 and the third valve V3. At the compressor 32 the refrigerant is compressed again and circulated through the refrigerant flow path 70 repeatedly in order to cool the passenger cabin 114.

At operational state 3 of the method 210, the start-stop engine system 116 turns off the engine 112, and the controller 20 closes valve V4, when the vehicle 110 is stopped to improve fuel economy and reduce wear of the engine 112. Stopping the engine 112 also stops the compressor 32. To cool the passenger cabin 114 when the compressor 32 is not running, the controller 20 keeps the first valve V1 open, which allows the compressed refrigerant within the compressed refrigerant tank 40 to flow through the condenser 34, the thermal expansion valve 36, and the evaporator 38 to cool the passenger cabin 114. The controller 20 actuates or otherwise controls the second valve V2 so that refrigerant flowing from the evaporator 38 flows to the secondary refrigerant flow path 72 and into the refrigerant suction tank 50 for storage therein. The compressed refrigerant rank 40 is in a high pressure state and the refrigerant suction tank 50 is in a low pressure state, which promotes refrigerant flow to the refrigerant suction tank 50. The third valve V3 is closed by the controller 20 to prevent refrigerant from flowing from the refrigerant suction tank 50 to the compressor 32.

After the start-stop engine system 116 restarts the engine 112 and the compressor 32, such as when the operator of the vehicle 110 presses the accelerator, the controller 20 closes the first valve V1 and opens fourth valve V4 to re-pressurize the compressed refrigerant tank 40 at operational state 4. The controller 20 also closes the second valve V2, and configures the third valve V3 to allow refrigerant to flow from the refrigerant suction tank 50 to the compressor 32. The valves V1, V2, and V3 remain in the configuration of operational state 4 until the controller 20 determines that pressure of the refrigerant suction tank 50 has dropped below a predetermined level based on inputs from the pressure sensor 52, thereby indicating that the refrigerant suction tank has been emptied, or substantially emptied, of refrigerant, and resulting in the refrigerant suction tank 50 being a low pressure tank.

After the pressure of the refrigerant suction tank 50 has fallen to or below the predetermined pressure, at operational state 5 the controller 20 configures the valve V3 to accept refrigerant flowing along refrigerant flow path 70 directly from the evaporator 38. The controller 20 also configures the second valve V2 so that refrigerant flowing from the evaporator 38 bypasses the refrigerant suction tank 50 and flows directly to the valve V3 and ultimately the compressor 32. The controller 20 opens valve V1 to allow refrigerant to flow out of the compressed refrigerant tank 40 and continue along the refrigerant flow path 70 to cool the passenger cabin 114. Operational state 5 is similar to operational state 2. The method returns to operational state 3 when the start-stop engine system 116 stops the vehicle 110. The present teachings thus advantageously provide for an air conditioning system 10 that is able to cool a passenger cabin 114 even when the start-stop engine system 116 has been activated to stop the engine 112 and the compressor 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An air conditioning system for a vehicle with a start-stop engine system, the air conditioning system comprising:
   a compressor;
   a condenser;
   a thermal expansion valve;
   an evaporator; and
   a compressed refrigerant tank arranged along a refrigerant flow path between the compressor and the condenser, the compressed refrigerant tank configured to store compressed refrigerant therein for supply to the evaporator when an engine of the vehicle is stopped.

2. The air conditioning system of claim 1, further comprising a refrigerant suction tank arranged along the refrigerant flow path downstream from the evaporator with respect to refrigerant flow through the air conditioning system.

3. The air conditioning system of claim 1, further comprising a first valve between the compressed refrigerant tank and the condenser;
   wherein the first valve is closed when refrigerant within the compressed refrigerant tank is below a target pressure, and the first valve is opened when refrigerant within the compressed refrigerant tank is at or above the target pressure.

4. The air conditioning system of claim 2, further comprising:
   a first valve between the compressed refrigerant tank and the condenser;
   a second valve between the evaporator and the refrigerant suction tank; and
   a third valve between the refrigerant suction tank and the compressor;
   wherein:
      the first valve is closed when refrigerant within the compressed refrigerant tank is below a target pressure, and the first valve is opened when refrigerant within the compressed refrigerant tank is at or above the target pressure;
      when the engine of the vehicle is on and refrigerant within the compressed refrigerant tank is at or above the target pressure, the second valve is configured to direct refrigerant directly to the compressor from the evaporator such that the refrigerant bypasses the refrigerant suction tank, and the third valve is configured to direct refrigerant from the evaporator to the compressor;
      when the engine of the vehicle is off, the first valve is opened, the second valve is configured to direct refrigerant from the evaporator to the refrigerant suction tank, and the third valve is closed to restrict flow of refrigerant to the compressor;

when the engine is restarted after bring turned off, the first valve is closed, the second valve is closed, and the third valve is opened to direct refrigerant from the refrigerant suction tank to the compressor; and after pressure of the refrigerant tank is reduced to or below a predetermined level, the first valve is opened, the second valve is configured to direct refrigerant directly from the evaporator to the compressor such that refrigerant bypasses the refrigerant suction tank, and the third valve is configured to direct refrigerant from the evaporator to the compressor.

5. The air conditioning system of claim 1, further comprising a controller configured to actuate valves of the air conditioning system to direct compressed refrigerant stored within the compressed refrigerant tank to the evaporator for absorbing heat when the engine and the compressor are stopped.

6. The air conditioning system of claim 2, wherein when the engine and the compressor are stopped, the air conditioning system is configured to:
   direct compressed refrigerant stored within the compressed refrigerant tank to the evaporator for absorbing heat; and
   direct refrigerant flowing from the evaporator to the refrigerant suction tank for storage therein while the engine and the compressor are stopped.

7. The air conditioning system of claim 6, wherein when the engine and the compressor are restarted after being stopped, the air conditioning system is configured to direct to the compressor refrigerant stored within the refrigerant suction tank.

8. The air conditioning system of claim 7, wherein after pressure of the refrigerant suction tank has been reduced to or below a target pressure, the air conditioning system is configured such that refrigerant flowing from the evaporator flows to the compressor and bypasses the refrigerant suction tank.

9. An air conditioning system for a vehicle with a start-stop engine system, the air conditioning system comprising:
   a compressed refrigerant tank configured to store compressed refrigerant therein for circulation through an evaporator when a compressor of the air conditioning system and an engine of the vehicle are both stopped;
   a refrigerant suction tank configured to store refrigerant flowing from the evaporator when the compressor and engine are stopped;
   a first valve between the compressed refrigerant tank and a condenser;
   a second valve between the evaporator and the refrigerant suction tank; and
   a third valve between the refrigerant suction tank and the compressor;
   wherein:
      the first valve is closed when refrigerant within the compressed refrigerant tank is below a target pressure, and the first valve is opened when refrigerant within the compressed refrigerant tank is at or above the target pressure;
      when the engine of the vehicle is on and refrigerant within the compressed refrigerant tank is at or above the target pressure, the second valve is configured to direct refrigerant directly to the compressor from the evaporator such that the refrigerant bypasses the refrigerant suction tank, and the third valve is configured to direct refrigerant from the evaporator to the compressor;
      when the engine of the vehicle is off, the first valve is open, the second valve is configured to direct refrigerant from the evaporator to the refrigerant suction tank, and the third valve is closed to restrict flow of refrigerant to the compressor;
      when the engine is restarted after bring turned off, the first valve is closed, the second valve is closed, and the third valve is opened to direct refrigerant from the refrigerant suction tank to the compressor; and
      after the refrigerant suction tank is emptied of refrigerant and pressure of the refrigerant suction tank is reduced to or below a predetermined level, the first valve is opened, the second valve is configured to direct refrigerant directly from the evaporator to the compressor such that refrigerant bypasses the refrigerant suction tank, and the third valve is configured to direct refrigerant from the evaporator to the compressor.

10. The air conditioning system of claim 9, further comprising a controller configured to actuate valves of the air conditioning system to direct compressed refrigerant stored within the compressed refrigerant tank to the evaporator, and from the evaporator to the refrigerant suction tank when the compressor and the engine are stopped.

11. The air conditioning system of claim 10, wherein when the engine and the compressor are restarted after being stopped, the air conditioning system is configured to direct to the compressor refrigerant stored within the refrigerant suction tank.

12. The air conditioning system of claim 11, wherein after pressure of the refrigerant suction tank has been reduced to or below a target temperature, the air conditioning system is configured such that refrigerant flowing from the evaporator flows to the compressor and bypasses the refrigerant suction tank.

13. A method for cooling a passenger cabin of a vehicle when an engine of the vehicle is stopped, and a compressor of an air conditioning system of the vehicle is stopped, the method comprising:
   compressing refrigerant with a compressor and storing the compressed refrigerant within a compressed refrigerant tank onboard the vehicle when the engine and the compressor are running;
   circulating the compressed refrigerant stored in the compressed refrigerant tank through an evaporator to absorb heat when the engine and the compressor are stopped; and
   collecting refrigerant flowing from the evaporator in a refrigerant suction tank when the engine and the compressor are stopped.

14. The method of claim 13, further comprising:
   after restarting the engine and the compressor, compressing with the compressor the refrigerant previously stored within the refrigerant suction tank, and storing compressed refrigerant in the compressed refrigerant tank.

15. The method of claim 13, further comprising:
   after restarting the engine and the compressor, directing refrigerant from the evaporator directly to the compressor such that the refrigerant bypasses the refrigerant suction tank.

* * * * *